June 2, 1925.

G. E. RANDLES

WASHING MACHINE

Original Filed June 25, 1924

INVENTOR:
GEORGE E. RANDLES,
by Alfred E. Bobrs
HIS ATTORNEY.

Patented June 2, 1925.

1,540,499

UNITED STATES PATENT OFFICE.

GEORGE EARL RANDLES, OF CLEVELAND, OHIO, ASSIGNOR TO THE FOOTE-BURT COMPANY, A CORPORATION OF OHIO.

WASHING MACHINE.

Original application filed June 25, 1924, Serial No. 722,394. Divided and this application filed November 29, 1924. Serial No. 752,836.

*To all whom it may concern:*

Be it known that I, GEORGE E. RANDLES, a citizen of the United States, residing at Cleveland, in the county of Cuyahoga and State of Ohio, have invented certain new and useful Improvements in Washing Machines, of which the following is a specification.

The present invention relates to washing machines and especially to washing machines of the suction cup or pounder type, this application being a division of my application Serial Number 722,394, filed June 25, 1924.

In connection with such washing machines it is desirable to so mount the bells or cups on the yoke that they are yieldable in a vertical direction, and the object of my invention is to provide an improved spring mounting for the suction cups or bells which is simple in structure, easy to assemble and which requires no openings through the top of the yoke whereby the yoke is left perfectly smooth on its top surface and presents no parts upon which clothes are likely to catch.

For a consideration of what I believe to be novel and my invention, attention is directed to the accompanying description and the claims appended thereto.

Figure 1:
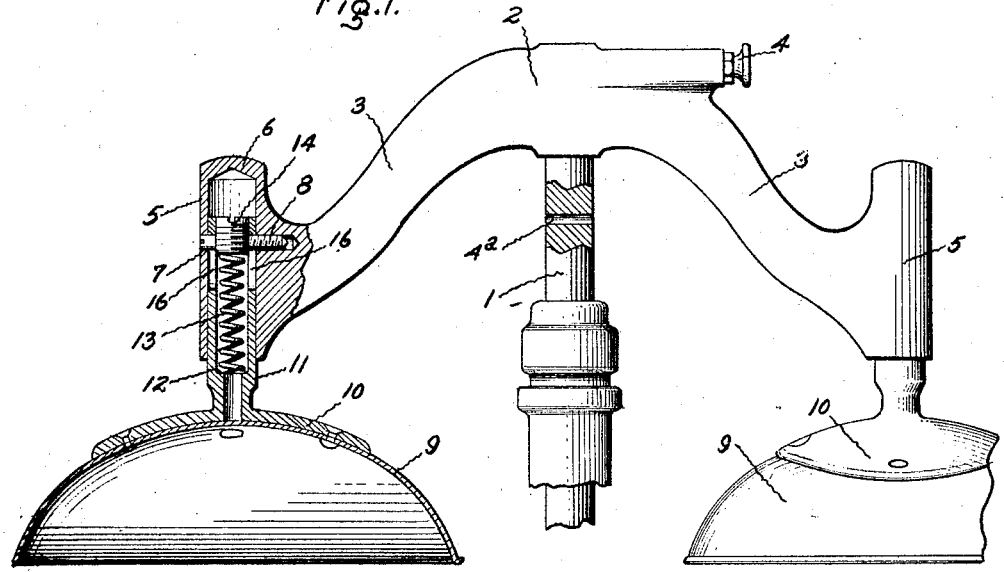
Figure 2:
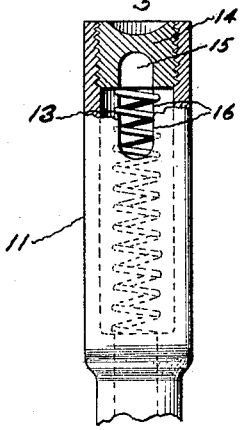

In the drawing, Fig. 1 is a side elevation, partly in section, of a structure embodying my invention, and Fig. 2 is a detail view, partly in section, of a spring mounting.

Referring to the drawing, 1 indicates the plunger rod of a washing machine of the suction cup type and 2 indicates the yoke which is mounted on the plunger rod and carries the suction cups or bells. The washing machine mechanism for actuating the plunger rod may be of any suitable type. For example, it may be of the type or construction shown in my Patent Number 1,520,886, dated December 30, 1924. The yoke may comprise any suitable number of arms 3, two being shown in the present instance, and is preferably adjustably mounted on the plunger rod, being held by a pin 4 adapted to engage any one of several spaced openings 4ª in the upper end of the plunger rod.

At the end of each yoke arm is a downwardly facing socket 5 which is closed at the top by a smooth wall 6 which is rounded so as to present a pleasing appearance and leave no sharp corners upon which clothes might catch. Extending through the wall forming socket 5 is an opening 7 which is threaded at its inner end and is adapted to receive a screw or pin 8. Each suction cup or bell 9 is riveted or otherwise fastened to a flange 10 on the lower end of a tubular stem 11. Stem 11 is provided with an internal shoulder 12 upon which seats the lower end of a spring 13, the upper end of such spring engaging a nut or plug 14 which screws into the upper open end of the stem. Nut or plug 14 is provided with a downwardly open slot 15 which stands in line with an elongated slot 16 in stem 11 and with opening 7, screw 8 passing through slots 15 and 16. The slot 15 in nut 14 is of a depth such that screw 8 can just pass through it above the top of spring 13, the spring being thus in engagement with the screw. The spring is held under the desired compression by nut or plug 14. The slot 16 in stem 11 is of a length such as to permit of the desired amount of axial movement of stem 11 in socket 5. When the upward pressure on the suction cup is excessive, spring 13 yields to permit stem 11 to move upward in socket 5, the spring being compressed against the pin 8.

This spring construction and mounting has the advantage that it is simple in structure, is easy to assemble, and leaves the yoke with a perfectly smooth exterior and without cracks or joints into which water can leak. It has the further advantage that it provides a construction which is pleasing in appearance and easy to manufacture.

In assembling the yoke structure, the spring 13 is placed in stem 11 after which nut or plug 14 is screwed into position to hold the spring compressed, the nut being turned to bring slot 15 into line with slot 16. The stem is then inserted into socket 5 and screw or pin 8 put into position, it being passed through slots 15 and 16 above spring 13. This makes a simple assembling operation which can be quickly and easily performed.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim as new and desire to secure by Letters Patent of the United States is:—

1. In a suction cup washing machine, a yoke having a socket open at its lower end, a suction cup having a tubular stem with a slot in its wall, said stem projecting into the socket, a spring in the stem, means in the upper end of the stem which holds the spring under compression and below the upper end of the slot, and a pin which passes through the socket and said slot above the spring to fasten the stem in the socket.

2. In a suction cup washing machine, a yoke having a socket open at its lower end, a suction cup having a tubular stem with a slot in its wall, said stem projecting into the socket, a spring in the stem, a plug in the upper end of the stem which holds the spring under compression and is provided with a slot in alignment with the slot in the stem, and a pin which passes through said slots above the top of the spring to fasten the stem in the socket.

3. In a suction cup washing machine, a member having a socket, a tubular stem which projects into the socket, said stem being provided with an elongated slot, means providing in the upper end of the stem an open slot which stands in line with the upper end of said elongated slot, a spring in said stem, and a pin which projects through said aligned slots to fasten the stem in the socket.

In witness whereof, I have hereunto set my hand this 24th day of November, 1924.

GEORGE EARL RANDLES.